United States Patent
Boualleg et al.

(10) Patent No.: US 11,338,279 B2
(45) Date of Patent: May 24, 2022

(54) METHOD FOR PREPARING A SELECTIVE BIMETALLIC HYDROGENATION CATALYST MADE OF NICKEL AND COPPER

(71) Applicant: IFP Energies nouvelles, Rueil-Malmaison (FR)

(72) Inventors: Malika Boualleg, Rueil-Malmaison (FR); Anne-Agathe Quoineaud, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/048,691

(22) PCT Filed: Apr. 5, 2019

(86) PCT No.: PCT/EP2019/058580
§ 371 (c)(1),
(2) Date: Oct. 19, 2020

(87) PCT Pub. No.: WO2019/201617
PCT Pub. Date: Oct. 24, 2019

(65) Prior Publication Data
US 2021/0154654 A1  May 27, 2021

(30) Foreign Application Priority Data
Apr. 18, 2018 (FR) ...................................... 1853389

(51) Int. Cl.
| | | |
|---|---|---|
| *B01J 37/02* | (2006.01) | |
| *B01J 6/00* | (2006.01) | |
| *B01J 23/72* | (2006.01) | |
| *B01J 23/755* | (2006.01) | |
| *B01J 37/18* | (2006.01) | |
| *B01J 37/20* | (2006.01) | |
| *C10G 45/36* | (2006.01) | |
| *B01J 21/04* | (2006.01) | |

(52) U.S. Cl.
CPC ........... *B01J 37/0205* (2013.01); *B01J 6/001* (2013.01); *B01J 23/72* (2013.01); *B01J 23/755* (2013.01); *B01J 37/024* (2013.01); *B01J 37/0209* (2013.01); *B01J 37/18* (2013.01); *B01J 37/20* (2013.01); *C10G 45/36* (2013.01); *B01J 21/04* (2013.01)

(58) Field of Classification Search
CPC ... B01J 6/001; B01J 21/04; B01J 23/72; B01J 23/755; B01J 37/0205; B01J 37/0209; B01J 37/024; B01J 37/08; B01J 37/18; B01J 37/20; C10G 45/36; C10G 45/48
See application file for complete search history.

(56) References Cited

U.S. PATENT DOCUMENTS

| | | |
|---|---|---|
| 5,208,405 A | 5/1993 | Cheung et al. |
| 5,948,942 A | 9/1999 | Ramirez de Agudelo et al. |
| 8,236,723 B2 | 8/2012 | Timmer et al. |
| 8,637,425 B2 | 1/2014 | Fischer et al. |
| 2011/0160503 A1 | 6/2011 | Fischer et al. |
| 2016/0264882 A1 | 9/2016 | Corvaisier et al. |

FOREIGN PATENT DOCUMENTS

| | | |
|---|---|---|
| FR | 2949077 A1 | 2/2011 |
| FR | 2949078 A1 | 2/2011 |
| FR | 3011844 A1 | 4/2015 |
| WO | 07084471 A1 | 7/2007 |

OTHER PUBLICATIONS

International Search Report PCT/EP2019/058580 dated Aug. 23, 2019 (pp. 1-16).

*Primary Examiner* — Brian A McCaig
(74) *Attorney, Agent, or Firm* — Millen, White, Zelano & Branigan, PC; Ryan Pool

(57) ABSTRACT

A method for preparing a catalyst with a bimetallic active phase made of nickel and copper, and a support comprising a refractory oxide, wherein the method involves:
a) placing the support in contact with at least one solution containing a nickel precursor;
b) placing the support in contact with a solution containing a copper precursor;
wherein a) and b) are carried out separately in any order;
c) drying the catalyst precursor at the end of a) and b), or b) and a), at a temperature less than 250° C.; and
d) supplying the catalyst precursor obtained at the end of c), into a hydrogenation reactor, and carrying out a reduction step by placing the precursor in contact with a reducing gas at a temperature of less than 200° C. and for a period greater than or equal to 5 minutes and less than 2 hours.

14 Claims, No Drawings

METHOD FOR PREPARING A SELECTIVE BIMETALLIC HYDROGENATION CATALYST MADE OF NICKEL AND COPPER

TECHNICAL FIELD

The present invention relates to a method for preparing a supported metallic catalyst, comprising nickel and copper, intended particularly for the hydrogenation of unsaturated hydrocarbons.

The present invention also relates to the use of these catalysts in reactions for the hydrogenation of unsaturated hydrocarbons, and more particularly selective hydrogenation of olefinic fractions.

PRIOR ART

Catalysts for the selective hydrogenation of polyunsaturated compounds are generally based on metals from Group VIII of the Periodic Table of the Elements, such as nickel. The metal is in the form of nanoscale metallic particles deposited on a support which may be a refractory oxide. The content of metal from Group VIII, the optional presence of a second metal element, the size of the metallic particles and the distribution of the active phase in the support and also the nature and the pore distribution of the support are parameters which may have an influence on the performance of the catalysts.

The rate of the hydrogenation reaction is governed by several criteria, such as the diffusion of the reactants toward the surface of the catalyst (external diffusional limitations), the diffusion of the reactants in the porosity of the support toward the active sites (internal diffusional limitations) and the intrinsic properties of the active phase, such as the size of the metallic particles and the distribution of the active phase within the support.

The promotion of a nickel-based catalyst has frequently been proposed in order to improve performance levels in selective hydrogenation. For example, it is known from U.S. Pat. No. 5,208,405 to use a catalyst based on nickel and silver for the selective hydrogenation of $C_4$-$C_{10}$ diolefins. Furthermore, it is known to promote nickel, predominantly present, with metals of group IB, in particular gold (FR 2 949 077) or tin (FR 2 949 078). Document FR 3 011 844 discloses a catalyst for the implementation of a selective hydrogenation method comprising a support and an active metallic phase deposited on the support, the active metallic phase comprising copper and at least one nickel or cobalt metal in a Cu:(Ni and/or Co) molar ratio greater than 1.

Moreover, prior to the employment of such catalysts and the use thereof in a hydrogenation method, a step of reducing treatment in the presence of a reducing gas is carried out so as to obtain a catalyst comprising an active phase at least partially in metallic form. This treatment makes it possible to activate the catalyst and to form metallic particles. This treatment may be carried out in situ or ex situ, that is to say after or before the catalyst is charged to the hydrogenation reactor.

SUBJECTS OF THE INVENTION

Continuing its research in the field of hydrogenating catalysts, the applicant has now discovered that it is possible to prepare catalysts which are particularly active, and particularly selective, in the selective hydrogenation of polyunsaturated hydrocarbon fractions, by successively and not simultaneously placing two specific metallic precursors in contact on a porous support, chosen from nickel precursors and copper precursors, in a specific Cu:Ni ratio, and by carrying out, after these contacting steps, an in situ reduction step in the catalytic reactor in the presence of a reducing gas, at a temperature less than 200° C. Without wishing to be bound by any theory, it has been noted by the applicant that, during the preparation of the catalyst, the presence of copper greatly improves the reducibility of the nickel on the support, regardless of the order of addition of the metallic precursors (nickel and copper), which makes it possible to carry out a step of reducing the metal elements in the presence of a reducing gas at temperatures which are lower and reaction times which are shorter than those commonly used in the prior art. The use of less severe operating conditions than in the prior art makes it possible to directly carry out the reduction step within the reactor in which it is desired to carry out the selective hydrogenation of polyunsaturated fractions. Furthermore, the presence of copper in the catalyst makes it possible to maintain good activity and a longer service life of the catalyst when the latter is placed in contact with a hydrocarbon feedstock comprising sulfur, in particular steam cracking and/or catalytic cracking C3 hydrocarbon fractions. Indeed, compared to nickel, the copper present in the catalyst more easily captures the sulfur-containing compounds included in the feedstock, thereby avoiding irreversibly poisoning the most virulent active sites of the nickel which exist on the new catalyst. Finally, the preparation method according to the invention makes it possible in particular, by carrying out two distinct steps of impregnating the metallic precursors on the support, to avoid the formation of alloys based on nickel and copper, which are not desired in the context of the present invention. Indeed, a nickel-copper alloy would lead to a poorer activity and/or selectivity than those of nickel alone.

A subject of the present invention is a method for preparing a catalyst for the selective hydrogenation of polyunsaturated hydrocarbon fractions comprising a bimetallic active phase based on a first nickel metal element, in a proportion of 1 to 30% by weight of nickel element relative to the total weight of the catalyst, and a second copper metal element, in a proportion of 0.5 to 15% by weight of copper element relative to the total weight of the catalyst, the molar ratio between the copper and the nickel being less than 1, and a support comprising at least one refractory oxide chosen from silica, alumina and silica-alumina, said method comprising the following steps:

a) a step of placing the support in contact with at least one solution containing at least one nickel precursor;

b) a step of placing the support in contact with at least one solution containing at least one copper precursor;

the steps a) and b) being carried out separately in any order;

c) at least one step of drying the catalyst precursor at the end of step a) and b), or b) and a), at a temperature less than 250° C.;

d) supplying the catalyst precursor obtained at the end of step c), into a reactor for the selective hydrogenation of polyunsaturated hydrocarbon fractions, and carrying out a reduction step by placing said precursor in contact with a reducing gas at a temperature less than 200° C. and for a period greater than or equal to 5 minutes and less than 2 hours.

Preferably, step b) is carried out before step a).

Advantageously, step d) is carried out at a temperature of between 130 and 190° C.

Advantageously, step d) is carried out for between 10 minutes and 110 minutes.

Advantageously, the method according to the invention also comprises a step e) of passivation with a sulfur-containing compound after the reducing treatment step d).

Advantageously, a step of drying the catalyst precursor at a temperature less than 250° C. is carried out between step a) and step b).

Preferably, the copper content is between 0.5 and 12% by weight of copper element relative to the total weight of the catalyst.

Advantageously, the copper precursor is chosen from copper acetate, copper acetylacetonate, copper nitrate, copper sulfate, copper chloride, copper bromide, copper iodide or copper fluoride.

More preferably, the copper precursor is copper nitrate.

Advantageously, the reducing gas of step d) is dihydrogen.

Preferably, the hydrogen flow rate, expressed in l/hour/gram of catalyst precursor is between 0.01 and 100 l/hour/gram of catalyst precursor.

Preferably, a step of heat treatment of the dried catalyst precursor obtained in step c) is carried out, before step d), at a temperature of between 250 and 1000° C.

Advantageously, the support is an alumina.

Another subject according to the invention relates to a method for the selective hydrogenation of polyunsaturated compounds containing at least 2 carbon atoms per molecule, such as diolefins and/or acetylenics and/or alkenylaromatics, present in a hydrocarbon feedstock having a final boiling point of less than or equal to 300° C., which method is carried out at a temperature of between 0 and 300° C., at a pressure of between 0.1 and 10 MPa, at a hydrogen/(polyunsaturated compounds to be hydrogenated) molar ratio of between 0.1 and 10 and at an hourly space velocity of between 0.1 and 200 $h^{-1}$ when the method is carried out in the liquid phase, or at a hydrogen/(polyunsaturated compounds to be hydrogenated) molar ratio of between 0.5 and 1000 and at an hourly space velocity of between 100 and 40 000 $h^{-1}$ when the method is carried out in the gas phase, in the presence of a catalyst obtained according to the preparation method according to the invention.

DETAILED DESCRIPTION OF THE INVENTION

1. Definitions

Hereinbelow, the groups of chemical elements are given according to the CAS classification (CRC Handbook of Chemistry and Physics, published by CRC Press, Editor in Chief D. R. Lide, 81st edition, 2000-2001). For example, group VIII according to the CAS classification corresponds to the metals of columns 8, 9 and 10 according to the new IUPAC classification.

The degree of reduction (DR) of a metal M contained in the catalyst is defined as being the percentage of said metal M reduced after the step of reducing said catalyst. The degree of reduction (DR) corresponds to the ratio between the amount of metal reduced (M1) and the amount of theoretically reducible metal present on the catalyst, measured by X-ray fluorescence (M2), i.e. DR (%)=(M1/M2)×100. In the context of the present invention, the degree of reduction of the nickel (Ni) was measured by X-ray diffraction (XRD) analysis. The description of the method for measuring the amount of reducible metal on oxide catalysts is explained later in the description (cf. examples section).

The expression "the specific surface of the catalyst or of the support used for the preparation of the catalyst according to the invention" is intended to mean the BET specific surface determined by nitrogen adsorption in accordance with Standard ASTM D 3663-78 drawn up from the Brunauer-Emmett-Teller method described in the journal "The Journal of the American Chemical Society", 60, 309 (1938).

The term "macropores" is intended to mean pores, the opening of which is greater than 50 nm.

The term "mesopores" is intended to mean pores, the opening of which is between 2 nm and 50 nm, limits included.

The term "micropores" is intended to mean pores, the opening of which is less than 2 nm.

The term "total pore volume" of the catalyst or of the support used for the preparation of the catalyst according to the invention is intended to mean the volume measured by intrusion with a mercury porosimeter according to Standard ASTM D4284-83 at a maximum pressure of 4000 bar (400 MPa), using a surface tension of 484 dyne/cm and a contact angle of 140°. The wetting angle was taken equal to 140° by following the recommendations of the work "Techniques de l'ingénieur, traité analyse et caractérisation" [Techniques of the Engineer, Analysis Treatise and Characterization], pages 1050-1055, written by Jean Charpin and Bernard Rasneur.

In order to obtain better accuracy, the value of the total pore volume corresponds to the value of the total pore volume measured by intrusion with a mercury porosimeter measured on the sample minus the value of the total pore volume measured by intrusion with a mercury porosimeter measured on the same sample for a pressure corresponding to 30 psi (approximately 0.2 MPa).

The volume of the macropores and of the mesopores is measured by porosimetry by intrusion of mercury according to Standard ASTM D4284-83 at a maximum pressure of 4000 bar (400 MPa), using a surface tension of 484 dyne/cm and a contact angle of 140°. The value from which the mercury fills all the intergranular voids is set at 0.2 MPa and it is considered that, above this, the mercury penetrates into the pores of the sample.

The macropore volume of the catalyst or of the support used for the preparation of the catalyst according to the invention is defined as being the cumulative volume of mercury introduced at a pressure of between 0.2 MPa and 30 MPa, corresponding to the volume present in the pores with an apparent diameter of greater than 50 nm.

The mesopore volume of the catalyst or of the support used for the preparation of the catalyst according to the invention is defined as being the cumulative volume of mercury introduced at a pressure of between 30 MPa and 400 MPa, corresponding to the volume present in the pores with an apparent diameter of between 2 and 50 nm.

The micropore volume is measured by nitrogen porosimetry. The quantitative analysis of the microporosity is performed using the "t" method (method of Lippens-De Boer, 1965), which corresponds to a transform of the starting adsorption isotherm, as described in the publication "Adsorption by powders and porous solids. Principles, methodology and applications", written by F. Rouquérol, J. Rouquérol and K. Sing, Academic Press, 1999.

The median mesopore diameter is also defined as being the diameter such that, out of the combined pores constituting the mesopore volume, all the pores with a size of less than this diameter constitute 50% of the total mesopore volume determined by intrusion with a mercury porosimeter.

The median macropore diameter is also defined as being the diameter such that, out of the combined pores constituting the macropore volume, all the pores with a size of less than this diameter constitute 50% of the total macropore volume determined by intrusion with a mercury porosimeter.

2. Description

Catalyst Preparation Method

The method for preparing the catalyst comprising a bimetallic active phase based on nickel and copper, and a support comprising at least one refractory oxide chosen from silica, alumina and silica-alumina, comprises at least the following steps:

a) a step of placing the support in contact with at least one solution containing at least one nickel precursor;
b) a step of placing the support in contact with at least one solution containing at least one copper precursor;
the steps a) and b) being carried out separately in any order;
c) at least one step of drying the catalyst precursor at the end of step a) and b), or b) and a), at a temperature less than 250° C.;
d) supplying the catalyst precursor obtained at the end of step c), into a reactor for the selective hydrogenation of polyunsaturated hydrocarbon fractions or the hydrogenation of aromatic or polyaromatic compounds, and carrying out a reduction step by placing said precursor in contact with a reducing gas at a temperature less than 200° C. for a period greater than or equal to 5 minutes and less than 2 hours.

The steps of the method for preparing the catalyst are explained in detail below.

Step a) Contacting the Nickel Precursor

The deposition of nickel on said support, in accordance with the implementation of step a), can be carried out by impregnation, dry or in excess, or even by deposition-precipitation, according to methods well known to those skilled in the art.

Said step a) is preferentially carried out by impregnation of the support consisting, for example, in placing said support in contact with at least one solution, which is aqueous or organic (for example methanol or ethanol or phenol or acetone or toluene or dimethyl sulfoxide (DMSO)) or else consists of a mixture of water and of at least one organic solvent, containing at least one nickel precursor at least partially in the dissolved state, or else in placing said support in contact with at least one colloidal solution of at least one nickel precursor, in the oxidized form (nanoparticles of oxides, of oxy(hydroxide) or of hydroxide of the nickel) or in the reduced form (metal nanoparticles of the nickel in the reduced state). Preferably, the solution is aqueous. The pH of this solution could be modified by the optional addition of an acid or of a base. According to another preferred alternative form, the aqueous solution may contain aqueous ammonia or ammonium $NH_4$ ions.

Preferably, said step a) is carried out by dry impregnation, which consists in placing the catalyst support in contact with a solution containing at least one nickel precursor, in which the volume of the solution is between 0.25 and 1.5 times the pore volume of the support to be impregnated.

When the nickel precursor is introduced in aqueous solution, a nickel precursor is advantageously used in the form of nitrate, carbonate, acetate, chloride, hydroxide, hydroxycarbonate, oxalate, sulfate or formate, of complexes formed by a polyacid or an acid-alcohol and its salts, of complexes formed with acetylacetonates, of tetrammine or hexammine complexes, or else of any other inorganic derivative soluble in aqueous solution, which is placed in contact with said support.

Preferably, nickel nitrate, nickel hydroxide, nickel carbonate, nickel chloride or nickel hydroxycarbonate is advantageously used as nickel precursor. Very preferably, the nickel precursor is nickel nitrate, nickel carbonate or nickel hydroxide.

The amounts of the nickel precursor(s) introduced into the solution are chosen such that the total nickel content is between 1 and 30% by weight, preferably between 5 and 22% by weight, preferably between 7 and 18% by weight of said element relative to the total weight of the catalyst.

Step b) Contacting the Copper Precursor

The deposition of copper on said support, in accordance with the implementation of step b), can be carried out by impregnation, dry or in excess, or even by deposition-precipitation, according to methods well known to those skilled in the art.

Said step b) is preferentially carried out by impregnation of the support consisting, for example, in placing said support in contact with at least one solution, which is aqueous or organic (for example methanol or ethanol or phenol or acetone or toluene or dimethyl sulfoxide (DMSO)) or else consists of a mixture of water and of at least one organic solvent, containing at least one copper precursor at least partially in the dissolved state, or else in placing said support in contact with at least one colloidal solution of at least one copper precursor, in the oxidized form (nanoparticles of oxides, of oxy(hydroxide) or of hydroxide of copper) or in the reduced form (metal nanoparticles of copper in the reduced state). Preferably, the solution is aqueous. The pH of this solution could be modified by the optional addition of an acid or of a base.

Preferably, said step b) is carried out by dry impregnation, which consists in placing the catalyst support in contact with a solution containing at least one copper precursor, in which the volume of the solution is between 0.25 and 1.5 times the pore volume of the support to be impregnated.

When the copper precursor is introduced in aqueous solution, a copper precursor in mineral or organic form is advantageously used. In mineral form, the copper precursor can be chosen from copper acetate, copper acetylacetonate, copper nitrate, copper sulfate, copper chloride, copper bromide, copper iodide or copper fluoride. Very preferably, the copper precursor salt is copper nitrate.

The amounts of the copper precursor(s) introduced into the solution are chosen such that the total copper content is between 0.5 and 15% by weight of copper element relative to the total weight of the catalyst, preferably between 0.5 and 12% by weight, preferably between 0.75 and 10% by weight, and even more preferably between 1 and 9% by weight.

Steps a) and b) are carried out separately in any order. The impregnation of the nickel precursor is not carried out at the same time as the impregnation of the copper precursor, so as not to form an alloy based on nickel-copper, which is not desirable in the context of the present invention as this would lead to a poorer activity and/or selectivity than those of nickel alone.

Preferably, step b) is carried out before step a), that is to say a first step of impregnating the support with a copper precursor is carried out, then a second step of impregnating the support with a nickel precursor is carried out (pre-impregnation). The applicant has discovered that the pre-impregnation (with respect to the impregnation of the nickel precursor) of a copper precursor on the support makes it possible to obtain better results in terms of reducibility of the nickel compared to a post-impregnation of the copper precursor (with respect to the impregnation of the nickel precursor), that is to say that a first step of impregnating the support with a nickel precursor is carried out, then a second step of impregnating the support with a copper precursor is carried out, this being for identical catalyst reduction operating conditions (temperature, time, reducing gas).

Optionally, between the two successive impregnation steps, a step of drying the catalyst precursor is carried out at a temperature less than 250° C., preferably between 15 and 240° C., more preferentially between 30 and 220° C., even more preferentially between 50 and 200° C., and even more preferentially between 70 and 180° C., for a period typically between 10 minutes and 24 hours.

Step c) Drying the Impregnated Support

Step c) of drying the impregnated support is carried out at a temperature less than 250° C., preferably between 15 and 180°, more preferentially between 30 and 160° C., even more preferentially between 50 and 150° C., and even more preferentially between 70 and 140° C., for a period typically between 10 minutes and 24 hours. Longer periods of time are not ruled out, but do not necessarily afford any improvement.

The drying step can be carried out by any technique known to those skilled in the art. It is advantageously carried out under an inert atmosphere or under an oxygen-containing atmosphere or under a mixture of inert gas and oxygen. It is advantageously carried out at atmospheric pressure or at reduced pressure. Preferably, this step is carried out at atmospheric pressure and in the presence of air or nitrogen.

Heat Treatment of the Dried Catalyst (Optional Step)

The dried catalyst precursor can undergo an additional heat treatment step d) at a temperature of between 250 and 1000° C. and preferably between 250 and 750° C., for a period typically between 15 minutes and 10 hours, under an inert atmosphere or under an oxygen-containing atmosphere, optionally in the presence of water. Longer treatment times are not ruled out but do not necessarily afford any improvement.

The term "heat treatment" is intended to mean temperature treatment respectively without the presence or in the presence of water. In the latter case, contact with the steam can take place at atmospheric pressure or under autogenous pressure. Several combined cycles without the presence or with the presence of water can be performed. After this or these treatment(s), the catalyst precursor comprises nickel in the oxide form, that is to say in the NiO form.

In the event of water being present, the water content is preferably between 150 and 900 grams per kilogram of dry air and even more preferably between 250 and 650 grams per kilogram of dry air.

Step d) Reduction with a Reducing Gas

Prior to the use of the catalyst in the catalytic reactor and the implementation of a hydrogenation method, a reducing treatment step d) is carried out in the presence of a reducing gas so as to obtain a catalyst comprising nickel at least partially in the metallic form. This step is carried out in situ, that is to say after charging of the catalyst to a reactor for selective hydrogenation of polyunsaturated compounds. This treatment makes it possible to activate said catalyst and to form metallic particles, in particular of nickel in the zero-valent state. The in-situ implementation of the catalyst reducing treatment makes it possible to dispense with an additional step of passivation of the catalyst with an oxygen-bearing compound or $CO_2$, which is necessarily the case when the catalyst is prepared by carrying out a reducing treatment ex-situ, that is to say outside the reactor used for selective hydrogenation. In fact, when the reducing treatment is carried out ex-situ, it is necessary to carry out a passivation step in order to preserve the metallic phase of the catalyst in the presence of air (during operations of transport and charging of the catalyst to the hydrogenation reactor), then to carry out a new step of reducing the catalyst.

The reducing gas is preferably hydrogen. The hydrogen can be used pure or as a mixture (for example a hydrogen/nitrogen, hydrogen/argon or hydrogen/methane mixture). In the case where the hydrogen is used as a mixture, all the proportions can be envisaged.

According to an essential aspect of the preparation method according to the invention, said reducing treatment is carried out at a temperature less than 200° C., preferably between 130 and 190° C., and more preferentially between 145 and 175° C. The duration of the reducing treatment is carried out for a period greater than or equal to 5 minutes and less than 2 hours, preferably between 10 minutes and 110 minutes. The use of less severe operating conditions than in the prior art makes it possible to directly carry out the reduction step within the reactor in which it is desired to carry out the selective hydrogenation of polyunsaturated fractions. Furthermore, the presence of copper in the catalyst makes it possible to preserve good activity of the catalyst and a good service life of the catalyst when the latter is placed in contact with a hydrocarbon feedstock comprising sulfur, in particular steam cracking and/or catalytic cracking C3 hydrocarbon fractions. Indeed, compared to nickel, the copper present in the catalyst more easily captures the sulfur-containing compounds included in the feedstock, thereby avoiding irreversibly poisoning the most virulent active sites of the nickel which exist on the new catalyst. The rise in temperature up to the desired reduction temperature is generally slow, for example set between 0.1 and 10° C./min, preferably between 0.3 and 7° C./min.

The hydrogen flow rate, expressed in l/hour/gram of catalyst precursor, is between 0.01 and 100 l/hour/gram of catalyst precursor, preferably between 0.05 and 10 l/hour/gram of catalyst precursor and more preferably still between 0.1 and 5 l/hour/gram of catalyst precursor.

Step e) Passivation (Optional Step)

The catalyst prepared according to the method according to the invention can optionally undergo a passivation step with a sulfur-containing compound which makes it possible to improve the selectivity of the catalysts and to avoid thermal runaway during the start-up of new catalysts. The passivation generally consists in irreversibly poisoning, by the sulfur-containing compound, the most virulent active sites of the nickel which exist on the new catalyst and thus in weakening the activity of the catalyst in favour of its selectivity. The passivation step is carried out using methods known to those skilled in the art.

The passivation step with a sulfur-containing compound is generally carried out at a temperature of between 20 and 350° C., preferably between 40 and 200° C., for 10 to 240 minutes. The sulfur-containing compound is, for example, chosen from the following compounds: thiophene, thiophane, alkyl monosulfides, such as dimethyl sulfide, diethyl sulfide, dipropyl sulfide and propyl methyl sulfide, or also an organic disulfide of formula HO—$R_1$—S—S—$R_2$—OH, such as dithiodiethanol of formula HO—$C_2H_4$—S—S—$C_2H_4$—OH (often known as DEODS). The sulfur content is generally between 0.1% and 2% by weight of said element relative to the total weight of the catalyst.

Catalyst

The catalyst that can be obtained by the preparation method according to the invention comprises an active phase based on nickel and copper, and a support containing a refractory oxide chosen from silica, alumina and silica-alumina.

The amounts of the copper precursor(s) introduced into the solution are chosen such that the total copper content is between 0.5 and 15% by weight of copper element relative to the total weight of the catalyst, preferably between 0.5 and 12% by weight, preferably between 0.75 and 10% by weight, and even more preferably between 1 and 9% by weight. The presence of copper greatly improves the reducibility of the nickel on the support, regardless of the order of addition of the metallic precursors (nickel and copper), which makes it possible to carry out a step of reducing the metal elements in the presence of a reducing gas at temperatures which are lower and reaction times which are shorter than those commonly used in the prior art.

The amounts of the nickel precursor(s) introduced into the solution are chosen such that the total nickel content is between 1 and 30% by weight, preferably between 5 and 22% by weight, preferably between 7 and 18% by weight of said element relative to the total weight of the catalyst.

The molar ratio between the copper and nickel must be less than 1, preferably less than 0.8, more preferentially less than 0.7, even more preferentially less than 0.6, preferably less than 0.5, and even more preferably less than 0.4.

The porous support is chosen from the group consisting of silica, alumina and silica-alumina. Even more preferably, the support is alumina. The alumina may be present in all possible crystallographic forms: alpha, delta, theta, chi, rho, eta, kappa, gamma, etc., taken alone or as a mixture. Preferably, the support is chosen from alpha, delta, theta and gamma alumina.

The specific surface area of the porous support is generally greater than 5 $m^2/g$, preferably between 30 and 400 $m^2/g$, preferably between 50 and 350 $m^2/g$.

The total pore volume of the support is generally between 0.1 and 1.5 $cm^3/g$, preferably between 0.35 and 1.2 $cm^3/g$, and even more preferentially between 0.4 and 1.0 $cm^3/g$, and even more preferentially between 0.45 and 0.9 $cm^3/g$.

Said catalyst is generally presented in all the forms known to those skilled in the art, for example in the form of beads (generally having a diameter of between 1 and 8 mm), of extrudates, of blocks or of hollow cylinders. Preferably, it consists of extrudates with a diameter generally of between 0.5 and 10 mm, preferably between 0.8 and 3.2 mm and very preferably between 1.0 and 2.5 mm and with a mean length of between 0.5 and 20 mm. The term "mean diameter" of the extrudates is intended to mean the mean diameter of the circle circumscribed in the cross section of these extrudates. The catalyst can advantageously be presented in the form of cylindrical, multilobal, trilobal or quadrilobal extrudates. Preferably, its shape will be trilobal or quadrilobal. The shape of the lobes could be adjusted according to all the methods known from the prior art.

The specific surface area of the catalyst is generally greater than 5 $m^2/g$, preferably between 30 and 400 $m^2/g$, preferably between 50 and 350 $m^2/g$.

The total pore volume of the catalyst is generally between 0.1 and 1.5 $cm^3/g$, preferably between 0.35 and 1.2 $cm^3/g$, and even more preferentially between 0.4 and 1.0 $cm^3/g$, and even more preferentially between 0.45 and 0.9 $cm^3/g$.

The catalyst advantageously has a macroporous volume less than or equal to 0.6 ml/g, preferably less than or equal to 0.5 ml/g, more preferentially less than or equal to 0.4 ml/g, and even more preferentially less than or equal to 0.3 ml/g.

The mesoporous volume of the catalyst is generally at least 0.10 ml/g, preferably at least 0.20 ml/g, preferably between 0.25 ml/g and 0.80 ml/g, more preferably between 0.30 and 0.65 ml/g.

The median mesopore diameter can be between 3 and 25 nm, preferably between 6 and 20 nm and particularly preferably between 8 and 18 nm.

The catalyst advantageously exhibits a median macropore diameter of between 50 and 1,500 nm, preferably between 80 and 1,000 nm and more preferably still of between 250 and 800 nm.

Preferably, the catalyst exhibits a low microporosity; very preferably, it does not exhibit any microporosity.

Selective Hydrogenation Method

Another subject of the present invention is a method for the selective hydrogenation of polyunsaturated compounds containing at least 2 carbon atoms per molecule, such as diolefins and/or acetylenics and/or alkenylaromatics, also known as styrenics, present in a hydrocarbon feedstock having a final boiling point of less than or equal to 300° C., which method is carried out at a temperature of between 0 and 300° C., at a pressure of between 0.1 and 10 MPa, at a hydrogen/(polyunsaturated compounds to be hydrogenated) molar ratio of between 0.1 and 10 and at an hourly space velocity of between 0.1 and 200 $h^{-1}$ when the method is carried out in the liquid phase, or at a hydrogen/(polyunsaturated compounds to be hydrogenated) molar ratio of between 0.5 and 1000 and at an hourly space velocity of between 100 and 40 000 $h^{-1}$ when the method is carried out in the gas phase, in the presence of a catalyst obtained by the preparation method as described above in the description.

Monounsaturated organic compounds, such as, for example, ethylene and propylene, are at the root of the manufacture of polymers, of plastics and of other chemicals having added value. These compounds are obtained from natural gas, from naphtha or from gas oil which have been treated by steam cracking or catalytic cracking methods. These methods are carried out at high temperature and produce, in addition to the desired monounsaturated compounds, polyunsaturated organic compounds, such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ fraction (hydrocarbon compounds having at least 5 carbon atoms), in particular diolefin or styrene or indene compounds. These polyunsaturated compounds are highly reactive and result in side reactions in the polymerization units. It is thus necessary to remove them before making economic use of these fractions.

Selective hydrogenation is the main treatment developed to specifically remove undesirable polyunsaturated compounds from these hydrocarbon feedstocks. It makes possible the conversion of polyunsaturated compounds to the corresponding alkenes or aromatics while avoiding their complete saturation and thus the formation of the corresponding alkanes or naphthenes. In the case of steam cracking gasolines used as feedstock, the selective hydrogenation also makes it possible to selectively hydrogenate the alkenylaromatics to give aromatics while avoiding the hydrogenation of the aromatic nuclei.

The hydrocarbon feedstock treated in the selective hydrogenation method has a final boiling point of less than or equal to 300° C. and contains at least 2 carbon atoms per molecule and comprises at least one polyunsaturated compound. The term "polyunsaturated compounds" is intended to mean compounds comprising at least one acetylenic function and/or at least one diene function and/or at least one alkenylaromatic function.

More particularly, the feedstock is selected from the group consisting of a steam cracking C2 fraction, a steam cracking C2-C3 fraction, a steam cracking C3 fraction, a steam cracking C4 fraction, a steam cracking C5 fraction and a steam cracking gasoline, also known as pyrolysis gasoline or C5+ fraction.

The steam cracking C2 fraction, advantageously used for the implementation of the selective hydrogenation method according to the invention, exhibits, for example, the following composition: between 40% and 95% by weight of ethylene and of the order of 0.1% to 5% by weight of acetylene, the remainder being essentially ethane and methane. In some steam cracking C2 fractions, between 0.1% and 1% by weight of C3 compounds may also be present.

The steam cracking C3 fraction, advantageously used for the implementation of the selective hydrogenation method according to the invention, exhibits, for example, the following mean composition: of the order of 90% by weight of propylene and of the order of 1% to 8% by weight of propadiene and of methylacetylene, the remainder being essentially propane. In some C3 fractions, between 0.1% and 2% by weight of C2 compounds and of C4 compounds may also be present.

A C2-C3 fraction can also advantageously be used for the implementation of the selective hydrogenation method according to the invention. It exhibits, for example, the following composition: of the order of 0.1% to 5% by weight of acetylene, of the order of 0.1% to 3% by weight of propadiene and of methylacetylene, of the order of 30% by weight of ethylene and of the order of 5% by weight of propylene, the remainder being essentially methane, ethane and propane. This feedstock may also contain between 0.1% and 2% by weight of C4 compounds.

The steam cracking C4 fraction, advantageously used for the implementation of the selective hydrogenation method according to the invention, exhibits, for example, the following mean composition by weight: 1% by weight of butane, 46.5% by weight of butene, 51% by weight of butadiene, 1.3% by weight of vinylacetylene and 0.2% by weight of butyne. In some C4 fractions, between 0.1% and 2% by weight of C3 compounds and of C5 compounds may also be present.

The steam cracking C5 fraction, advantageously used for the implementation of the selective hydrogenation method according to the invention, exhibits, for example, the following composition: 21% by weight of pentanes, 45% by weight of pentenes and 34% by weight of pentadienes.

The steam cracking gasoline or pyrolysis gasoline, advantageously used for the implementation of the selective hydrogenation method according to the invention, corresponds to a hydrocarbon fraction, the boiling point of which is generally between 0 and 300° C., preferably between 10 and 250° C. The polyunsaturated hydrocarbons to be hydrogenated present in said steam cracking gasoline are in particular diolefin compounds (butadiene, isoprene, cyclopentadiene, and the like), styrene compounds (styrene, α-methylstyrene, and the like) and indene compounds (indene, and the like). The steam cracking gasoline generally comprises the C5-C12 fraction with traces of C3, C13, C14 and C15 (for example between 0.1% and 3% by weight for each of these fractions). For example, a feedstock formed of pyrolysis gasoline generally has a composition as follows: 5% to 30% by weight of saturated compounds (paraffins and naphthenes), 40% to 80% by weight of aromatic compounds, 5% to 20% by weight of mono-olefins, 5% to 40% by weight of diolefins and 1% to 20% by weight of alkenylaromatic compounds, the combined compounds forming 100%. It also contains from 0 to 1000 ppm by weight of sulfur, preferably from 0 to 500 ppm by weight of sulfur.

Preferably, the polyunsaturated hydrocarbon feedstock treated in accordance with the selective hydrogenation method according to the invention is a steam cracking C2 fraction or a steam cracking C2-C3 fraction or a steam cracking gasoline.

The selective hydrogenation method according to the invention is targeted at removing said polyunsaturated hydrocarbons present in said feedstock to be hydrogenated without hydrogenating the monounsaturated hydrocarbons. For example, when said feedstock is a C2 fraction, the selective hydrogenation method is targeted at selectively hydrogenating acetylene. When said feedstock is a C3 fraction, the selective hydrogenation method is targeted at selectively hydrogenating propadiene and methylacetylene. In the case of a C4 fraction, the aim is to remove butadiene, vinylacetylene (VAC) and butyne; in the case of a C5 fraction, the aim is to remove the pentadienes. When said feedstock is a steam cracking gasoline, the selective hydrogenation method is targeted at selectively hydrogenating said polyunsaturated hydrocarbons present in said feedstock to be treated so that the diolefin compounds are partially hydrogenated to give mono-olefins and so that the styrene and indene compounds are partially hydrogenated to give corresponding aromatic compounds while avoiding the hydrogenation of the aromatic nuclei.

The technological implementation of the selective hydrogenation method is, for example, carried out by injection, as ascending or descending stream, of the polyunsaturated hydrocarbon feedstock and of the hydrogen into at least one fixed bed reactor. Said reactor may be of isothermal type or of adiabatic type. An adiabatic reactor is preferred. The feedstock of polyunsaturated hydrocarbons can advantageously be diluted by one or more reinjection(s) of the effluent, resulting from said reactor where the selective hydrogenation reaction takes place, at various points of the reactor, located between the inlet and the outlet of the reactor, in order to limit the temperature gradient in the reactor. The technological implementation of the selective hydrogenation method according to the invention can also advantageously be carried out by the implantation of at least said supported catalyst in a reactive distillation column or in reactors-exchangers or in a slurry-type reactor. The stream of hydrogen may be introduced at the same time as the feedstock to be hydrogenated and/or at one or more different points on the reactor.

The selective hydrogenation of the steam cracking C2, C2-C3, C3, C4, C5 and C5+ fractions can be carried out in the gas phase or in the liquid phase, preferably in the liquid phase for the C3, C4, C5 and C5+ fractions and in the gas phase for the C2 and C2-C3 fractions. A liquid-phase reaction makes it possible to lower the energy cost and to increase the cycle period of the catalyst.

Generally, the selective hydrogenation of a hydrocarbon feedstock containing polyunsaturated compounds containing at least 2 carbon atoms per molecule and having a final boiling point of less than or equal to 300° C. is carried out at a temperature of between 0 and 300° C., at a pressure of between 0.1 and 10 MPa, at a hydrogen/(polyunsaturated compounds to be hydrogenated) molar ratio of between 0.1 and 10 and at an hourly space velocity HSV (defined as the ratio of the flow rate by volume of feedstock to the volume of the catalyst) of between 0.1 and 200 h$^{-1}$ for a method carried out in the liquid phase, or at a hydrogen/(polyunsaturated compounds to be hydrogenated) molar ratio of between 0.5 and 1000 and at an hourly space velocity HSV of between 100 and 40 000 h$^{-1}$ for a method carried out in the gas phase.

In one embodiment according to the invention, when a selective hydrogenation method is carried out wherein the feedstock is a steam cracking gasoline comprising polyunsaturated compounds, the (hydrogen)/(polyunsaturated compounds to be hydrogenated) molar ratio is generally between 0.5 and 10, preferably between 0.7 and 5.0 and more preferably still between 1.0 and 2.0, the temperature is between 0 et 200° C., preferably between 20 and 200° C. and more preferably still between 30 and 180° C., the hourly space velocity (HSV) is generally between 0.5 and 100 h$^{-1}$, preferably between 1 and 50 h$^{-1}$, and the pressure is generally between 0.3 and 8.0 MPa, preferably between 1.0 and 7.0 MPa and more preferably still between 1.5 and 4.0 MPa.

More preferably, a selective hydrogenation method is carried out wherein the feedstock is a steam cracking gasoline comprising polyunsaturated compounds, the hydrogen/(polyunsaturated compounds to be hydrogenated) molar ratio is between 0.7 and 5.0, the temperature is between 20 and 200° C., the hourly space velocity (HSV) is generally between 1 and 50 h$^{-1}$ and the pressure is between 1.0 and 7.0 MPa.

More preferably still, a selective hydrogenation method is carried out wherein the feedstock is a steam cracking gasoline comprising polyunsaturated compounds, the hydrogen/(polyunsaturated compounds to be hydrogenated) molar ratio is between 1.0 and 2.0, the temperature is between 30 and 180° C., the hourly space velocity (HSV) is generally between 1 and 50 h$^{-1}$ and the pressure is between 1.5 and 4.0 MPa.

The hydrogen flow rate is adjusted in order to have available a sufficient amount thereof to theoretically hydrogenate all of the polyunsaturated compounds and to maintain an excess of hydrogen at the reactor outlet.

In another embodiment according to the invention, when a selective hydrogenation method is carried out wherein the feedstock is a steam cracking C2 fraction and/or a steam cracking C2-C3 fraction comprising polyunsaturated compounds, the (hydrogen)/(polyunsaturated compounds to be hydrogenated) molar ratio is generally between 0.5 and 1000, preferably between 0.7 and 800, the temperature is between 0 et 300° C., preferably between 15 and 280° C., the hourly space velocity (HSV) is generally between 100 and 40 000 h$^{-1}$, preferably between 500 and 30 000 h$^{-1}$, and the pressure is generally between 0.1 and 6.0 MPa, preferably between 0.2 and 5.0 MPa.

The invention will now be illustrated by the following examples which are in no way limiting.

EXAMPLES

For all the catalysts mentioned in the examples mentioned below, the support is an alumina A having a specific surface area of 80 m$^2$/g, a pore volume of 0.7 ml/g and a median pore diameter of 12 nm.

Example 1: Preparation of an Aqueous Solution of Ni Precursors

The aqueous solution of Ni precursors (solution S) used for the preparation of the catalysts A to G is prepared by dissolving 43.5 g of nickel nitrate Ni(NO$_3$)$_2$.6H$_2$O, (supplier Strem Chemicals®) in a volume of 13 ml of distilled water. The solution S, the Ni concentration of which is 350 g of Ni per liter of solution, is obtained.

Example 2: Catalyst A—15% by Weight of Ni (Comparative)

The solution S prepared in example 1 is impregnated under dry conditions on 10 g of alumina A. The solid thus obtained is subsequently dried in an oven overnight at 120° C. and then calcined under a stream of air of 1 l/h/g of catalyst at 450° C. for 2 hours. The calcined catalyst thus prepared contains 15% by weight of the nickel element relative to the total weight of the alumina-supported catalyst.

Example 3: Catalyst B—15% by Weight of Ni+0.1% of Cu as Pre-Impregnation (Comparative)

Impregnation No. 1

A copper nitrate solution prepared so as to obtain in the end 0.1% by weight of Cu on the final catalyst is impregnated under dry conditions on the alumina A. The solid thus obtained is then dried in an oven overnight at 120° C.

Impregnation No. 2

The solution S prepared in example 1 is then impregnated under dry conditions on 10 g of catalyst precursor previously prepared during the first impregnation. The solid thus obtained is subsequently dried in an oven overnight at 120° C., and then calcined under a stream of air of 1 l/h/g of catalyst at 450° C. for 2 hours.

Example 4: Catalyst C—15% by Weight of Ni+1% by Weight of Cu as Pre-Impregnation (According to the Invention)

The protocol used in this example is identical to that of example 3 above, with the exception that a copper nitrate solution is prepared allowing 1% by weight of Cu to be placed on the alumina.

Example 5: Catalyst D—15% by Weight of Ni+1% by Weight of Cu in Co-Impregnation (Comparative)

A copper nitrate solution is prepared so as to obtain in the end 1% by weight of copper element on the final catalyst. The copper solution and the solution S are added at the same time to the alumina (co-impregnation).

The solid thus obtained is subsequently dried in an oven at 120° C. for 12 h and then calcined under a stream of air of 1 l/h/g of catalyst at 450° C. for 2 hours.

Example 6: Catalyst F—15% by Weight of Ni+2% by Weight of Cu as Post-Impregnation (According to the Invention)

Impregnation No. 1

The solution S prepared in example 1 is impregnated under dry conditions on 10 g of alumina A. The solid thus obtained is subsequently dried in an oven at 120° C. for 12 h.

Impregnation No. 2

A copper nitrate solution is prepared so as to obtain in the end 2% by weight of copper element on the final catalyst, then is impregnated under dry conditions on the catalyst precursor previously prepared from the first impregnation.

The solid thus obtained is subsequently dried in an oven at 120° C. for 12 h and then calcined under a stream of air of 1 l/h/g of catalyst at 450° C. for 2 hours.

Example 7: Catalyst E—15% by Weight of Ni+2% by Weight of Cu as Pre-Impregnation (According to the Invention)

The protocol used in this example is identical to that of example 3 above, with the exception that a copper nitrate solution is prepared allowing 2% by weight of Cu to be placed on the alumina A.

Example 8: Catalyst G—15% by Weight of Ni+5% by Weight of Cu as Pre-Impregnation (According to the Invention)

The protocol used in this example is identical to that of example 3 above, with the exception that a copper nitrate solution is prepared allowing 5% by weight of Cu to be placed on the alumina A.

Example 9: Characterization

All the catalysts contain the contents targeted during impregnation, that is to say 15% of nickel element (characterized by X-ray Fluorescence) relative to the total weight of the catalyst, and the % of Copper added (characterized by X-ray Fluorescence).

The amount of nickel in metallic form obtained after the reduction step was determined by X-ray diffraction (XRD) analysis on samples of catalyst in powder form. Between the reduction step and throughout the duration of the characterization by XRD, the catalysts are never returned to the open air. The diffraction patterns are obtained by radiocrystallographic analysis by means of a diffractometer using the conventional powder method with K$\alpha$1 radiation of copper ($\lambda$=1.5406 Å).

The degree of reduction was calculated by calculating the area of the line of Ni located around 52°2$\theta$, on all of the diffractograms of each sample of catalyst analyzed, then by subtracting the signal present as soon as ambient temperature is reached under the line at 52°, which is due to alumina. Alumina in delta and theta form, CuO (tenorite) and NiO were detected at ambient temperature on all the copper- and nickel-containing catalysts, after calcination.

Table 1 below collates the degrees of reduction (expressed as % by weight relative to the total weight of Ni) for all the catalysts A to G characterized by XRD after a reduction step at 170° C. for 90 minutes under a hydrogen stream. These values were also compared with the degree of reduction obtained for catalyst A (Ni alone) after a conventional reduction step (that is to say at a temperature of 400° C. for 15 hours under a hydrogen stream).

For catalyst G (5% Cu/15% Ni/alumina) after 90 minutes at 170° C. under a hydrogen stream ($H_2$), the degree of nickel reducibility is 100% and the degree of Cu° reducibility likewise. For catalyst A (15% Ni alone/alumina), the degree of nickel reducibility is 0% after exactly the same reduction treatment under hydrogen. Copper clearly makes it possible to reduce all of the nickel oxide present on the reduced nickel (Ni°) support.

Furthermore, the catalysts containing both copper and nickel were treated under a stream of hydrogen sulfide with a rise in temperature up to 300° C. The XRD spectra were recorded and analyzed as a function of time and temperature. It was analyzed that the NiO phase becomes sulfided to $Ni_3S_4$ and NiS and the CuO phase oxidizes to $Cu_{1.75}S$. Moreover, copper oxide is the species which becomes sulfided first. This shows that the catalysts prepared by the method according to the invention will be more resistant to sulfur-containing feedstocks, such as cracked gasolines, compared to catalysts prepared in a known manner, without the presence of copper. Indeed, copper will capture sulfur as a priority, the Ni° remaining available for the hydrogenation of the various compounds of the feedstock to be treated.

Table 1 below summarizes the degrees of reducibility or the Ni° content for all the catalysts characterized by XRD after reduction at 170° C. for 90 minutes under a hydrogen stream. Also added, for comparison with a conventional reduction, was the degree of nickel reducibility after conventional reduction for 15 h at 400° C. under a hydrogen stream for Ni alone/alumina. As soon as 1% copper is added as pre-impregnation, the degree of nickel reducibility is 50%, whereas for the same treatment under $H_2$ for the catalyst Ni alone, the degree of nickel reducibility is zero. Furthermore, with the same amount of copper added and the same treatment under $H_2$, the addition of copper as pre-impregnation (catalyst C, 50% Ni°) is more efficient than the addition of copper as post-impregnation (catalyst E, 40% Ni), which itself is more effective than the addition of copper as co-impregnation (catalyst D, 30% Ni°). Furthermore, the addition of 2% copper (catalyst F, 80% Ni) leads to the same reduced Ni content as catalyst A which has undergone a treatment at higher temperature (400° C.) and for a longer duration (15 h). Finally, with the addition of 5% copper (catalyst G), 100% Ni° is reached for a treatment under $H_2$ at 170° C. for 90 minutes.

TABLE 1

Ni ° content after reduction at 170° C. for 90 minutes for all the catalysts and also at 400° C. for 15 hours for the Ni alone/alumina catalyst

| Catalyst | Reduction | Copper Content (%) | Copper Impregnation | Percentage of Ni ° (XRD) after reduction (%) |
|---|---|---|---|---|
| A (comparative) | 400° C., 15 h | 0 | — | 80 |
| A (comparative) | 170° C., 90 min | 0 | — | 0 |
| B (comparative) | 170° C., 90 min | 0.1 | Pre-impregnation | 25 |
| C (invention) | 170° C., 90 min | 1 | Pre-impregnation | 50 |
| D (comparative) | 170° C., 90 min | 1 | Co-impregnation | 30 |
| E (invention) | 170° C., 90 min | 1 | post-impregnation | 45 |
| F (invention) | 170° C., 90 min | 2 | Pre-impregnation | 80 |
| G (invention) | 170° C., 90 min | 5 | Pre-impregnation | 100 |

Example 10: Catalytic Tests: Performance Levels in Selective Hydrogenation of a Mixture Containing Styrene and Isoprene ($A_{HYD1}$)

Catalysts A to G described in the above examples are tested with regard to the reaction for the selective hydrogenation of a mixture containing styrene and isoprene.

The composition of the feedstock to be selectively hydrogenated is as follows: 8% by weight of styrene (supplied by Sigma Aldrich®, purity 99%), 8% by weight of isoprene (supplied by Sigma Aldrich®, purity 99%) and 84% by weight of n-heptane (solvent) (supplied by VWR®, purity>99% Chromanorm HPLC). This composition corresponds to the initial composition of the reaction mixture. This mixture of model molecules is representative of a pyrolysis gasoline.

The selective hydrogenation reaction is carried out in a 500 ml stainless steel autoclave which is provided with a magnetically-driven mechanical stirrer and which is able to operate under a maximum pressure of 100 bar (10 MPa) and temperatures of between 5° C. and 200° C. 214 ml of n-heptane (supplied by VWR®, purity>99% Chromanorm HPLC) and an amount of 3 ml of catalyst are added to an autoclave. The autoclave is closed and purged. The autoclave is then pressurized under 35 bar (3.5 MPa) of hydrogen. The catalyst is first reduced in situ, at 170° C. for 90 minutes (temperature increase gradient of 1° C./min) for catalysts A to G. The autoclave is then brought to the test temperature equal to 30° C. At time t=0, approximately 30 g of a mixture containing styrene, isoprene, n-heptane, pentanethiol and thiophene are introduced into the autoclave. The reaction mixture then has the composition described above and stirring is started at 1600 rev/min. The pressure is kept constant at 35 bar (3.5 MPa) in the autoclave using a storage cylinder located upstream of the reactor.

Another test was carried out for catalyst A, but with a catalyst reduction temperature of 400° C. for 15 hours.

The progress of the reaction is monitored by taking samples from the reaction medium at regular time intervals: the styrene is hydrogenated to give ethylbenzene, without hydrogenation of the aromatic ring, and the isoprene is hydrogenated to give methylbutenes. If the reaction is prolonged for longer than necessary, the methylbutenes are in their turn hydrogenated to give isopentane. The hydrogen consumption is also monitored over time by the decrease in pressure in a storage cylinder located upstream of the reactor. The catalytic activity is expressed in moles of $H_2$ consumed per minute and per gram of Ni.

The catalytic activities measured for catalysts A to G are reported in table 2 below. They are related to the catalytic activity ($A_{HYD1}$) measured for catalyst A prepared under conventional reduction conditions (at a temperature of 400° C. for 15 hours under a hydrogen stream).

TABLE 2

Comparison of the performance levels in selective hydrogenation of a mixture containing styrene and isoprene (AHYD1)

| Catalyst | Reduction | Copper Content (%) | Percentage of Ni ° (XRD) after reduction (%) | $A_{HYD1}$ (%) |
|---|---|---|---|---|
| A (comparative) | 400° C., 15 h | 0 | 80 | 100 |
| A (comparative) | 170° C., 90 min | 0 | 0 | 0 |
| B (comparative) | 170° C., 90 min | 0.1 | 25 | 20 |
| C (invention) | 170° C., 90 min | 1 | 50 | 53 |
| D (comparative) | 170° C., 90 min | 1 | 30 | 25 |
| E (invention) | 170° C., 90 min | 1 | 45 | 50 |
| F (invention) | 170° C., 90 min | 2 | 80 | 100 |
| G (invention) | 170° C., 90 min | 5 | 100 | 180 |

This clearly shows the improved performance levels of catalysts C, E, F and G according to the invention, compared to the catalyst Ni alone on alumina reduced at 170° C. for 90 min, which is completely inactive, and in particular the impact of the addition of a copper precursor before or after the addition of a nickel precursor within the catalyst precursor during the method for preparing same.

The invention claimed is:

1. A method for preparing a catalyst for the selective hydrogenation of polyunsaturated hydrocarbon fractions comprising a bimetallic active phase based on a first nickel metal element, in a proportion of 1 to 30% by weight of nickel element relative to the total weight of the catalyst, and a second copper metal element, in a proportion of 0.5 to 15% by weight of copper element relative to the total weight of the catalyst, the molar ratio between the copper and the nickel being less than 1, and a support comprising at least one refractory oxide chosen from silica, alumina and silica-alumina, said method comprising:
   a) placing the support in contact with at least one solution containing at least one nickel precursor;
   b) placing the support in contact with at least one solution containing at least one copper precursor;
   a) and b) being carried out separately in any order;
   c) at least one drying of the catalyst precursor at the end of a) and b), or b) and a), at a temperature less than 250° C.;
   d) supplying the catalyst precursor obtained at the end of c), into a reactor for the selective hydrogenation of polyunsaturated hydrocarbon fractions, and carrying out a reduction by placing said precursor in contact with a reducing gas at a temperature less than 200° C. for a period greater than or equal to 5 minutes and less than 2 hours,
   wherein a heat treatment of the dried catalyst precursor obtained in c) is carried out, before d), at a temperature of between 250 and 1000° C.

2. The method as claimed in claim 1, wherein b) is carried out before a).

3. The method as claimed in claim 1, wherein d) is carried out at a temperature of between 130 and 190° C.

4. The method as claimed in claim 1, wherein d) is carried out for between 10 minutes and 110 minutes.

5. The method as claimed in claim 1, also comprising a e) of passivation with a sulfur-containing compound after the reducing treatment d).

6. The method as claimed in claim 1, wherein a drying the catalyst precursor is carried out between a) and b), at a temperature less than 250° C.

7. The method as claimed in claim 1, wherein the copper content is between 0.5 and 12% by weight of copper element relative to the total weight of the catalyst.

8. The method as claimed in claim 1, wherein the copper precursor is chosen from copper acetate, copper acetylacetonate, copper nitrate, copper sulfate, copper chloride, copper bromide, copper iodide or copper fluoride.

9. The method as claimed in claim 8, wherein the copper precursor is copper nitrate.

10. The method as claimed in claim 1, wherein the reducing gas of d) is hydrogen.

11. The method as claimed in claim 10, wherein the hydrogen flow rate, expressed in l/hour/gram of catalyst precursor is between 0.01 and 100 l/hour/gram of catalyst precursor.

12. The method as claimed in claim 1, wherein the support is an alumina.

13. A method for the selective hydrogenation of polyunsaturated compounds containing at least 2 carbon atoms per molecule present in a hydrocarbon feedstock having a final boiling point of less than or equal to 300° C., which method is carried out at a temperature of between 0 and 300° C., at a pressure of between 0.1 and 10 MPa, at a hydrogen/(polyunsaturated compounds to be hydrogenated) molar ratio of between 0.1 and 10 and at an hourly space velocity of between 0.1 and 200 $h^{-1}$ when the method is carried out in the liquid phase, or at a hydrogen/(polyunsaturated compounds to be hydrogenated) molar ratio of between 0.5 and 1000 and at an hourly space velocity of between 100 and 40 000 $h^{-1}$ when the method is carried out in the gas phase, in the presence of a catalyst obtained according to claim 1.

14. The method according to claim 1 wherein said polyunsaturated compounds containing at least 2 carbon atoms per molecule are diolefins, acetylenics and/or alkenylaromatics.

* * * * *